United States Patent [19]

Torii et al.

[11] Patent Number: 5,325,467
[45] Date of Patent: Jun. 28, 1994

[54] ROBOT CONTROL METHOD BASED ON AN ACCELERATION/DECELERATION TIME CONSTANT

[75] Inventors: Nobutoshi Torii, Hachioji; Ryo Nihei, Yamanashi; Yasuo Naito, Yamanashi; Tetsuaki Kato, Yamanashi; Satoshi Kinoshita, Yamanashi, all of Japan

[73] Assignee: Fanuc Ltd., Yamanashi, Japan

[21] Appl. No.: 820,881

[22] PCT Filed: May 15, 1991

[86] PCT No.: PCT/JP91/00645

§ 371 Date: Jan. 17, 1992

§ 102(e) Date: Jan. 17, 1992

[87] PCT Pub. No.: WO91/18717

PCT Pub. Date: Dec. 12, 1991

[30] Foreign Application Priority Data

May 25, 1990 [JP] Japan ................. 2-136007

[51] Int. Cl.$^5$ ............................................. B25J 19/00
[52] U.S. Cl. ............................................. 395/96; 395/95
[58] Field of Search ................................ 395/95, 96

[56] References Cited

U.S. PATENT DOCUMENTS

| | | | |
|---|---|---|---|
| 4,554,497 | 11/1985 | Nozawa et al. | 364/178 |
| 4,603,286 | 7/1986 | Sakano | 318/615 |
| 4,819,184 | 4/1989 | Jonsson et al. | 395/96 |
| 4,908,556 | 3/1990 | Daggett et al. | 395/96 |
| 5,166,872 | 11/1992 | Weaver et al. | 364/133 |

FOREIGN PATENT DOCUMENTS

| | | |
|---|---|---|
| 0240570 | 3/1987 | European Pat. Off. |
| 0333867 | 3/1989 | European Pat. Off. |
| 0359819 | 3/1990 | European Pat. Off. |
| 57-189789 | 11/1982 | Japan |
| 58-149188 | 9/1983 | Japan |
| 60-9679 | 1/1985 | Japan |
| 2018466 | 10/1979 | United Kingdom |

*Primary Examiner*—Allen R. MacDonald
*Attorney, Agent, or Firm*—Staas & Halsey

[57] ABSTRACT

A robot control method based on an acceleration/deceleration time constant wherein the acceleration/deceleration time constant of a servomotor is set for an optimum value for each block, to thereby control the operation of the robot. A reaching speed (Vu) is determined from an amount of movement (X) of a block, and based on the reaching speed, a maximum torque (Tmax) of the servomotor is determined and then a static load torque ($T_{wn}$) is subtracted from the maximum torque (Tmax) to determine an acceleration torque ($Ta_n$). Thereafter, based on the acceleration torque ($Ta_n$) and the load inertia of the servomotor, an acceleration ($a_n$) is determined and an acceleration/deceleration time constant ($\tau$) is determined from the acceleration ($a_n$), and accordingly, an optimum acceleration/deceleration time constant is determined.

5 Claims, 5 Drawing Sheets

ROBOT CONTROL METHOD BASED ON AN ACCELERATION/DECELERATION TIME CONSTANT

BACKGROUND OF THE INVENTION

1. Field of the Invention

The present invention relates to a robot control method based on an acceleration/deceleration time constant, by which the operation of the robot is controlled by deciding the acceleration/deceleration time constant of a servomotor, and more particularly, to a robot control method based on an acceleration/deceleration time constant in which an optimum acceleration/deceleration time constant is determined for each block of movement of the robot to thereby control the operation of the robot.

2. Description of the Related Art

When a robot is adjusted on site, an acceleration time constant and deceleration time constant are set for each servomotor which drives each arm of the robot. The acceleration time constant and the deceleration time constant are combined, and thus are referred to as an acceleration/deceleration time constant. The acceleration/deceleration time constant depends significantly on the operating conditions of the robot, and therefore, it is difficult to establish a particular time constant to be applied to all cases. Accordingly, it must be decided by empirical judgements and trial operations, and the like.

Setting those time constants with such allowances, however, prolongs the cycle times, and setting them to smaller values tends to cause vibration and the like, which has an adverse affect on the positioning accuracy. Accordingly, the time constants must be set to exact values, but it is difficult to determine a standard on which quickly made objective judgements can be based, and accordingly, it is difficult to increase the operating speed when the robot is controlled with acceleration/deceleration time constants having large allowances, even when allowances are given to the torques of the servomotors.

SUMMARY OF THE INVENTION

The present invention is intended to solve the above-mentioned problem, and the object of the present invention is to provide a robot control method based on exact acceleration/deceleration time constants, whereby optimum acceleration/deceleration time constants of servomotors are established in accordance with an amount of movement and a load, and the like. Each servomotor is controlled to move each axis in the robot.

To attain the aforementioned object, a robot control method based on an acceleration/deceleration time constant is provided, in which the acceleration/deceleration time constant of a servomotor is determined for each block of movement of the servomotor moving one axis, to thereby control the operation of the robot, and wherein a reaching speed is determined from the amount of movement of the block, the output torque of the servomotor is determined from the reaching speed of the block controlled by the servomotor, a static load torque is subtracted from the output torque to determine an acceleration torque, an acceleration is determined from a load inertia of the acceleration torque and the servomotor, and an acceleration/deceleration time constant is determined from the obtained acceleration.

Therefore, the reaching speed is determined from the amount of movement of a block to be implemented. For example, if the amount of movement is small, then the reaching speed is also small, and if the amount of movement exceeds a certain value, then the reaching speed becomes a teaching speed. The speed of the servomotor is obtained from the reaching speed, and an output torque of the servomotor can be determined from the torque curve. A viscosity loss is subtracted beforehand to obtain the speed and torque curve. The accelerating torque for accelerating a load is obtained by subtracting the static load torque consisting of a friction torque and a torque from gravity, and the like, from the output torque, and the acceleration/deceleration time constant is determined from the accelerating torque, to thereby control the acceleration and deceleration of the robot.

DETAILED DESCRIPTION OF THE PREFERRED EMBODIMENTS

An embodiment of the present invention is described hereinafter with reference to the accompanying drawings.

Figure 2:
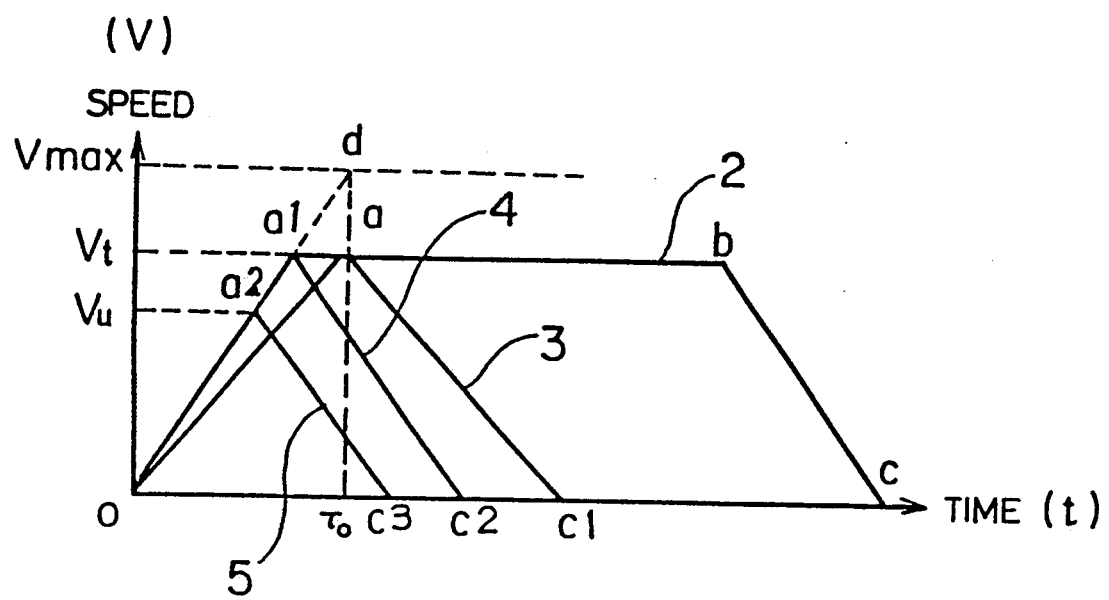
FIG. 2 is a graph showing the relationship between the amount of movement and the reaching speed of each axis of the robot.

FIG. 2 is the graph which shows the relationship between the amount of movement and reaching speed of each axis of the robot. The abscissa shown in FIG. 2 indicates time and the ordinate indicates speed. When the moving distance (or rotational angle) is large enough, the resulting line passes through all points, 0, a, b and c as shown by a line 2. More specifically, an axis accelerates until point "a", at a time constant $\tau_0$ moves at a teaching speed Vt, decelerates, and stops at point "c." In this case, the area enclosed by the lines formed by points 0, a, b, c, and 0 corresponds to the moving distance for one block of movement of the axis. As the moving distance decreases, the time during which the speed is constant between "a" and "b" becomes shorter. When the distance between "a" and "b" is larger than 0, this is called a long motion, and when the distance is 0 or less, this is called a short motion. At the boundary between the long motion and short motion, the locus is indicated by a line 3 containing 0, a, c and 1.

When the moving distance further decreases, the acceleration changes up to a straight line "0d" defined by the time constant $\tau_0$ and a maximum speed Vmax, to form a line 4 containing 0, a, 1, c and 2. When the moving distance further decreases, the locus is indicated by a line 5 containing 0, a, 2, c and 3. At that time, the maximum speed is Vu; this is referred to as the reaching speed.

Figure 3:
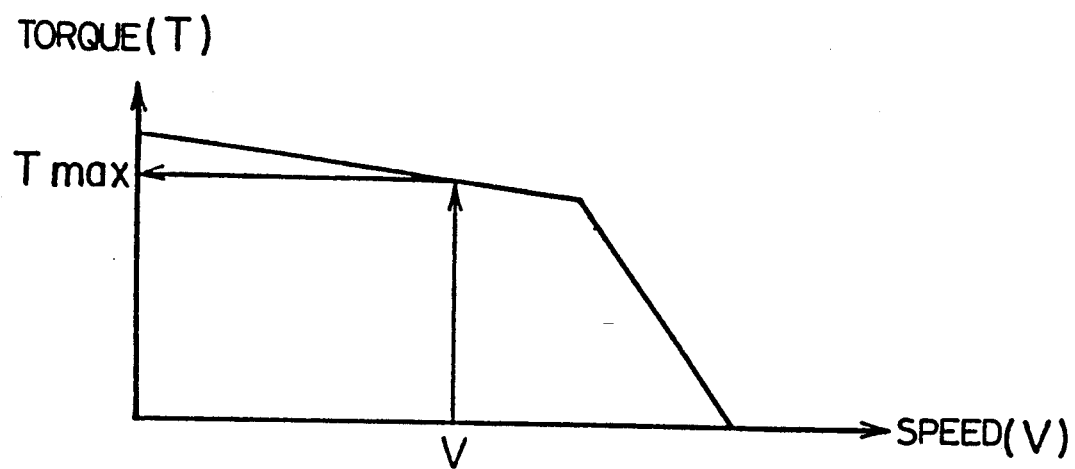
FIG. 3 is a graph showing the relationship between the speed and torque of a servomotor.

FIG. 3 shows the relationship between the speed of a servomotor and the torque. In FIG. 3, the abscissa indicates a speed (V) and the ordinate indicates a torque (T). Accordingly, when a certain speed V is determined, the corresponding maximum torque Tmax is determined, and this relationship is stored in the robot control device as data for each servomotor of the robot.

Figure 4:
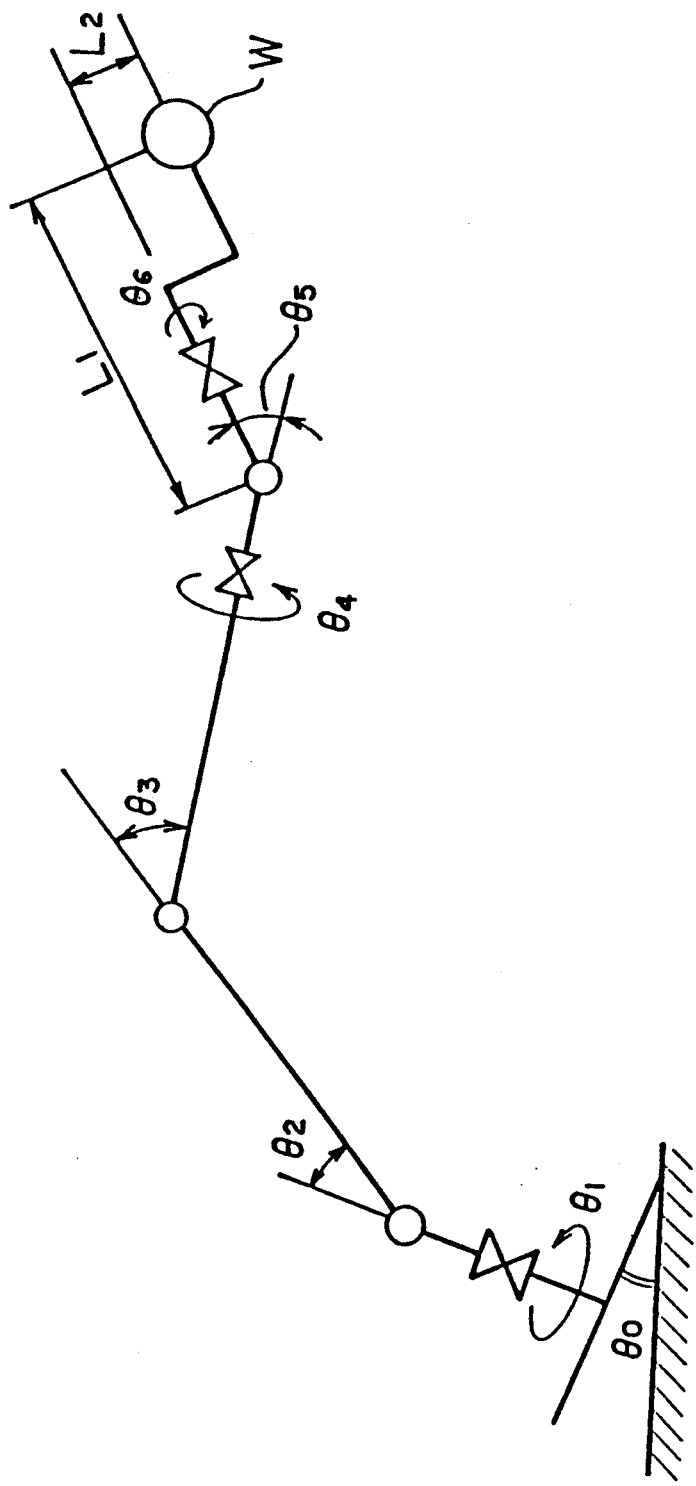
FIG. 4 is a skeleton diagram of the robot.

FIG. 4 is the skeleton diagram of the robot. In this figure, the angle at which the robot is set is denoted as $\theta_0$, and the angles of the 1st through 6th axes are denoted as $\theta_1$ through $\theta_6$, a load weight is denoted as W, and the offset amounts at the centroid of a load are denoted as $L_1$ and $L_2$. Accordingly, the inertia of each axis and a static load torque can be expressed by the following formulae, where the static load torque includes a friction torque and centroid torque.

The inertia of the 1st axis is denoted as $I_1$, the inertia of the 2nd axis as $I_2$, and inertias of the remaining axes as $I_3$, $I_4$, $I_5$ and $I_6$, respectively, in the same way. Similarly, the static load torque of the 1st axis is denoted as $T_{w1}$, the static load torque of the 2nd axis as $T_{w2}$, and the static load torques of the remaining axes as $T_{w3}$, $T_{w4}$, $T_{w5}$ and $T_{w6}$, respectively. Accordingly, these values can be determined from the following expressions:

$I_1 = F_1(\theta_2, \theta_3, \theta_4, \theta_5, \theta_6, L_1, L_2, W)$ $I_2 = F_2(\theta_3, \theta_4, \theta_5, \theta_6, L_1, L_2, W)$ $I_3 = F_3(\theta_4, \theta_5, \theta_6, L_1, L_2, W)$ $I_4 = F_4(\theta_5, \theta_6, L_1, L_2, W)$ $I_5 = F_5(\theta_6, L_1, L_2, W)$ $I_6 = F_6(L_1, L_2, W)$ $T_{w1} = G_1(\theta_0, \theta_1, \theta_2, \theta_3, \theta_4, \theta_5, \theta_6, L_1, L_2, W)$ $T_{w2} = G_2(\theta_0, \theta_1, \theta_2, \theta_3, \theta_4, \theta_5, \theta_6, L_1, L_2, W)$ $T_{w3} = G_3(\theta_0, \theta_1, \theta_2, \theta_3, \theta_4, \theta_5, \theta_6, L_1, L_2, W)$ $T_{w4} = G_4(\theta_0, \theta_1, \theta_2, \theta_3, \theta_4, \theta_5, \theta_6, L_1, L_2, W)$ $T_{w5} = G_5(\theta_0, \theta_1, \theta_2, \theta_3, \theta_4, \theta_5, \theta_6, L_1, L_2, W)$ $T_{w6} = G_6(\theta_0, \theta_1, \theta_2, \theta_3, \theta_4, \theta_5, \theta_6, L_1, L_2, W)$.

The functions $F_1$ through $F_6$, and $G_1$ through $G_6$ can be calculated from the structure and posture of the robot. Therefore, when the robot is placed under a particular condition, the inertias $I_1$ through $I_6$ and the static load torques $T_{w1}$ through $T_{w6}$ can be determined by an arithmetic operation carried out by the robot control device.

When reading a program, these inertias and static load torques are sequentially computed, to obtain a present position $P_n$ and a moving target position $P_{n+1}$. Nevertheless, the values for the values for $\theta_0$, $L_1$, $L_2$ and W are set at the time of teaching, because they vary depending on the particular operation of the robot.

Figure 5:
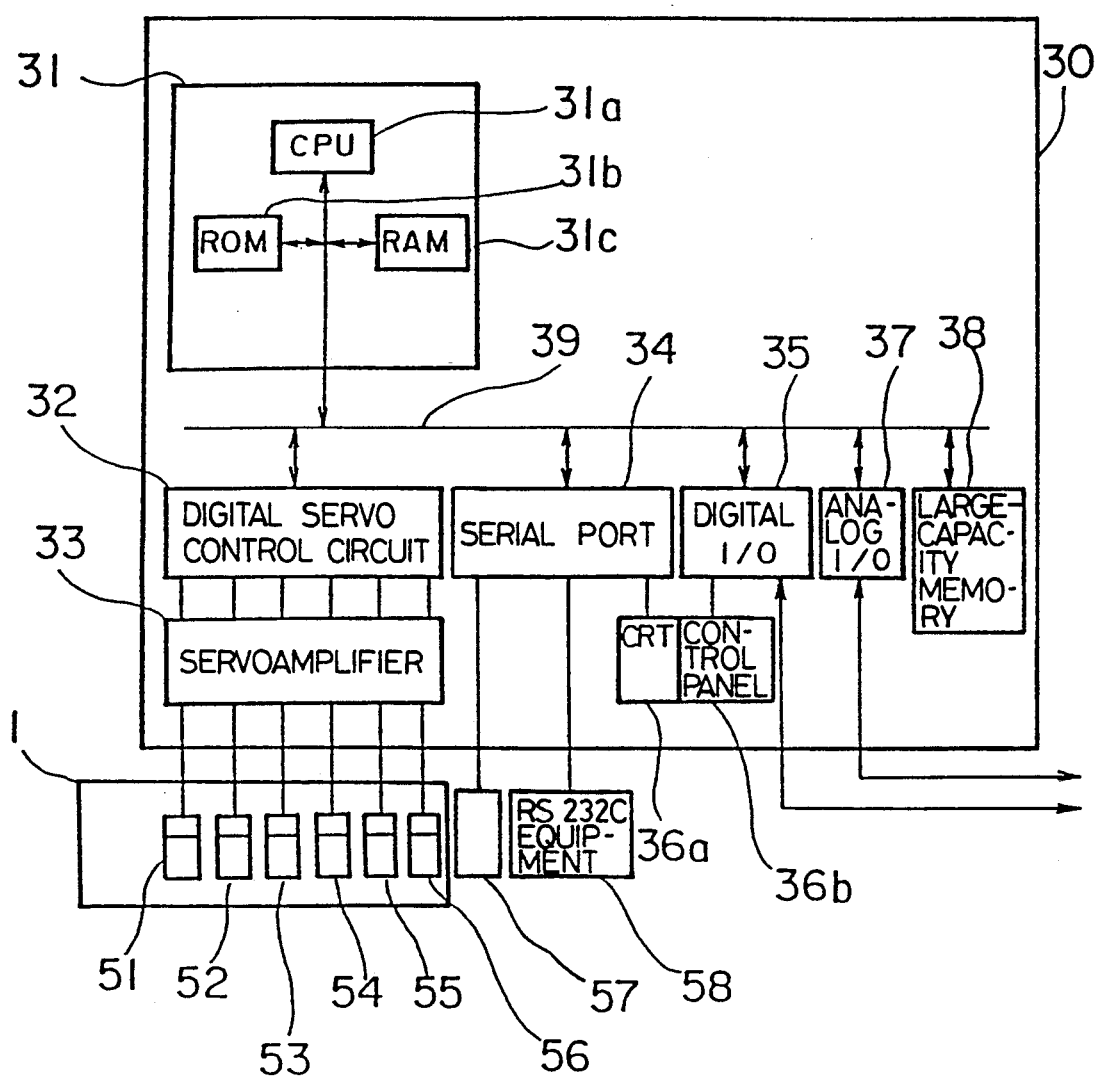
FIG. 5 is a block diagram of a robot control device for implementing the present invention.

FIG. 5 is a block diagram showing an outline of the robot control device for implementing the present invention. As shown in this figure, a robot control device 30 is provided with a processor board 31 including a processor 31a, ROM 31b, and RAM 31c, and the processor 31a controls the whole robot control device 30 in accordance with the system program stored in the ROM 31b. Data such as the aforementioned $L_1$, $L_2$ and W, an operating program and the like are stored in the RAM 31c. A part of the RAM 31c consists of a nonvolatile memory, and the data, the operating program and the like mentioned above are stored in the nonvolatile memory. The processor board 31 is connected to a bus 39.

A digital servo control circuit 32 is connected to the bus 39, and drives servomotors 51, 52, 53, 54, 55 or 56 via a servoamplifier 33 in response to commands issued by the processor board 31. The servomotors are incorporated in, and operate the individual axes of, a robot 1.

A serial port 34 is connected to the bus 39, a teaching console 57 with a display unit, and other RS232C equipment 58. The teaching console with the display unit is used to enter an operating program or the like. A CRT 36a is connected to the serial port 34.

A control panel 36b is connected to a digital I/O 35, and signals are output to the outside via the digital I/O 35 and an analog I/O 37. Also, teaching data and operating programs not being used are stored in a large-capacity memory 38.

In the above explanation, the servo control circuit 32 uses a digital servo control circuit, but the above also applies when an analog servo control circuit is used.

Figure 1:
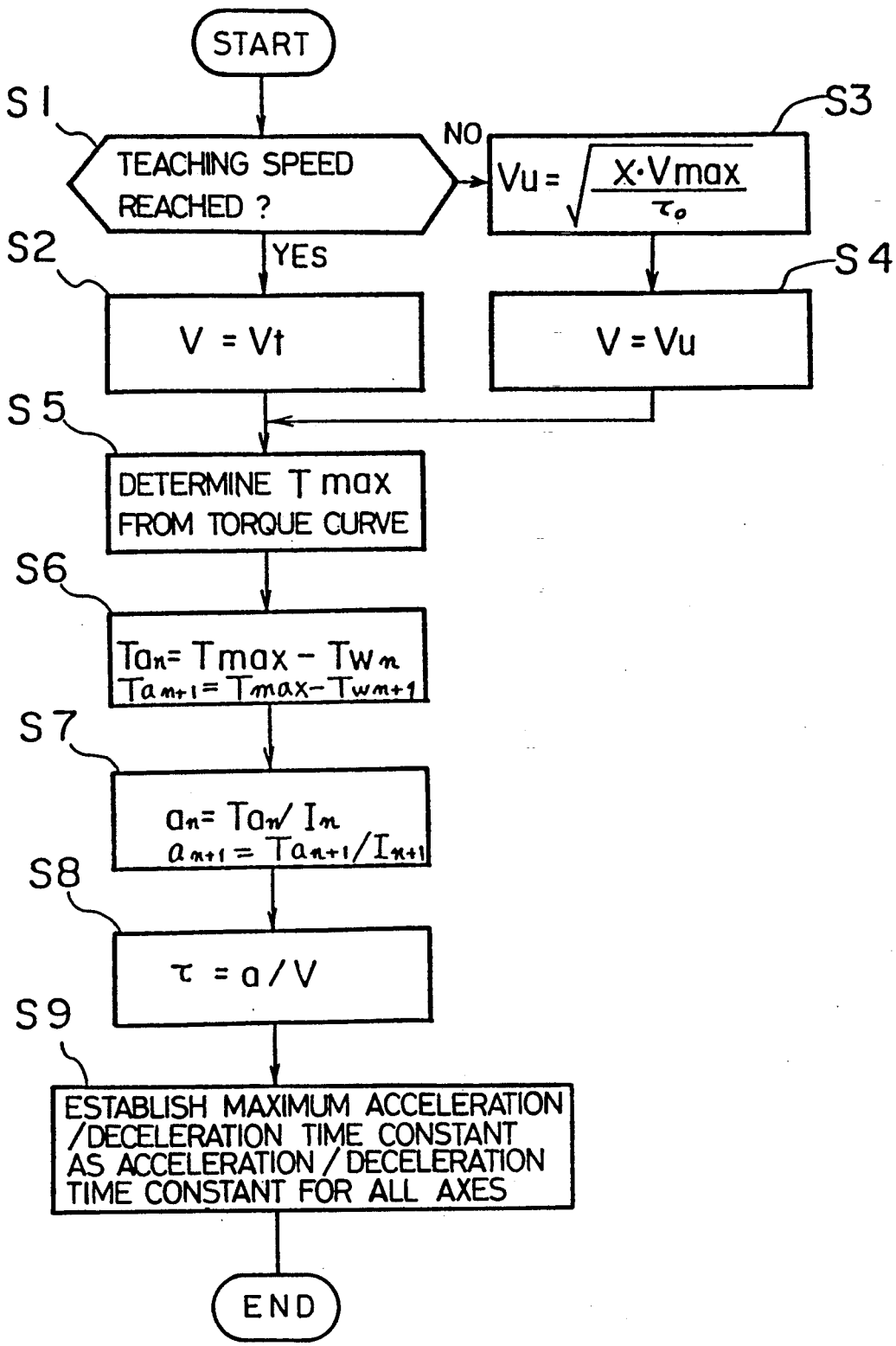
FIG. 1 is a flowchart of the robot control method based on the acceleration/deceleration time constant according to the present invention.

FIG. 1 is a flowchart of the robot control method based on an acceleration/deceleration time constant obtained according to the present invention, as described below. In the figure, the numerals following "S" indicate the step numbers.

[S1] Taking into account the distance to a moving target position, the system decides whether or not the speed has reached the teaching speed Vt. If the result is YES, the system proceeds to S2, and if NO, proceeds to S3.

[S2] The teaching speed Vt is established as the speed V.

[S3] The reaching speed Vu is determined according to the following expression:

$$Vu = (X \cdot V\max/\tau_0)^{\frac{1}{2}}.$$

[S4] The reaching speed Vu is established as the speed V.

[S5] The maximum torque Tmax for the speed V is determined from the torque curve given in FIG. 3.

[S6] The static load torque Tw is subtracted from the maximum torque Tmax to determine an acceleration torque Ta. Namely the static load torque at the present point denoted as $T_{wn}$ and the static load torque at the target point denoted as $T_{wn+1}$, acceleration torques $Ta_n$ and $Ta_{n+1}$ are determined for the static load torques at the present point and at the target point, respectively.

$Ta_n = T\max - T_{wn}$ $Ta_{n+1} = T\max - T_{wn+1}$.

[S7] The accelerations $a_n$ and $a_{n+1}$ are determined for each of the acceleration torques denoted as $Ta_n$ and $Ta_{n+1}$, the inertia at the present point denoted as $I_n$, and the inertia at the target point denoted as $I_{n+1}$.

$a_n = (Ta_n/I_n)$ $a_{n+1} = (Ta_{n+1}/I_{n+1})$.

In this case, $a_n$ or $a_{n+1}$, whichever is smaller, is taken as the acceleration a.

[S8] Using the acceleration a and the speed V, the acceleration/deceleration time constant $\tau$ is calculated from the following expression:

$$\tau = a/V.$$

It is possible to adjust the acceleration/deceleration time constant and the like by multiplying a constant A for a fine adjustment at each teaching point of a program.

Also, the steps from S1 through S8 are repeated for each axis of the robot. In this example, the robot has six axes.

[S9] Among the six axes, the largest $\tau$ is established as the acceleration/deceleration time constant for all axes. This sets the same acceleration/deceleration time constant such that the trajectory of the end of the robot arm does not deviate from a taught track.

If the trajectory is not important, then it is not necessary to use the same acceleration/deceleration time constant for all axes, and instead, an optimum acceleration/deceleration time constant may be determined for each axis.

In the above description, a joint-type robot consisting of six axes is used, but the acceleration/deceleration time constant may be set to an optimum value in the same way for other types of robot, thus reducing the operation time.

As explained above, according to the present invention, the acceleration/deceleration time constant for each axis can be determined from the reaching speed, inertia and the like, which allows an optimum acceleration/deceleration time constant to be determined and the operation time to be reduced.

We claim:

1. A robot control method based on an acceleration/deceleration time constant wherein the acceleration/deceleration time constants of servomotors, each respectively moving an axis of a robot, are set to optimum values for each block of movement of each of said axes over time, to thereby control the operation of the robot, comprising the steps of:

determining a reaching speed from an amount of movement of a block corresponding to an amount of movement of an axis of said robot moved by a servomotor over time;

determining an output torque of said servomotor moving said axis from said reaching speed;

determining an acceleration torque by subtracting a static load torque from said output torque;

determining an acceleration from said acceleration torque and a load inertia of said servomotor;

determining an acceleration/deceleration time constant from said acceleration; and controlling said servomotor based on said determined acceleration/deceleration time constant.

2. The robot control method based on an acceleration/deceleration time constant according to claim 1, further including the step of using said static load torque as an erasable parameter at a time of teaching so that said acceleration/deceleration time constant can be changed in accordance with a load of the robot.

3. The robot control method based on an acceleration/deceleration time constant according to claim 1, further including the step of adjusting said acceleration or said acceleration/deceleration time constant with a specific constant at each teaching point of an operating program.

4. The robot control method based on an acceleration/deceleration time constant according to claim 1, further comprising the steps of determining said acceleration/deceleration time constant for each said servomotor corresponding to a respective movement block and selecting a largest value among said acceleration/deceleration time constants to control all of said servomotors.

5. The robot control method based on an acceleration/deceleration time constant according to claim 1, further comprising the step of separately determining said acceleration/deceleration time constant for each said servomotor.

* * * * *